Patented May 22, 1945

2,376,422

UNITED STATES PATENT OFFICE 2,376,422

PRODUCTION OF CELLULOSE DERIVATIVES

Henry Dreyfus, London, England

No Drawing. Application July 8, 1942, Serial No. 450,188. In Great Britain July 15, 1941

9 Claims. (Cl. 260—225)

This invention is concerned with improvements in the production of cellulose derivatives and particularly with improvements in the production of mixed esters of cellulose.

According to the present invention mixed esters of cellulose are produced by esterifying a cellulose ester containing free hydroxy groups attached either to the nucleus or in a substituted radicle, particularly cellulose acetate or other lower aliphatic acid ester of cellulose, in a liquid medium comprising the appropriate anhydride and methylene or ethylene dichloride or other halogenated hydrocarbon and containing an acidic metal halide as catalyst. The liquid medium employed is one which is a solvent for the catalyst and which, on completion of esterification, yields a liquid medium which is a solvent for the mixed ester formed and it is desirable that it should also be a solvent for the cellulose ester employed as starting material or at least yield a medium which is a solvent for the mixed ester produced at an early stage of the esterification process. If the catalyst is not soluble in the mixture of halogenated hydrocarbon and anhydride sufficient acetone or other suitable organic liquid may be added to give a medium which is a solvent.

The process is applicable to the esterification of cellulose esters however they may have been produced. Thus, the esters may be made by suspension esterification of cellulose with the appropriate anhydride in the presence of a catalyst and benzene or other non-solvent. The process is, however, of particular importance in the production of mixed esters from cellulose acetate or other cellulose ester obtained by esterification of cellulose with the acid anhydride in a liquid medium which is a solvent for the ester, using e. g. sulphuric acid as catalyst.

The present application is particularly concerned with the esterification of lower aliphatic acid esters of cellulose containing free hydroxy groups and more than 1, e. g. 1.5–2.5, acetyl or other acid radicles per $C_6H_{10}O_5$ nucleus, especially with the esterification of ordinary commercial acetone-soluble cellulose acetate, which contains about 2.2–2.4 acetyl groups per $C_6H_{10}O_5$ nucleus. Other esters of lower aliphatic acids containing less than six carbon atoms which may be esterified are cellulose formate, propionate, butyrate and glycollate. Cellulose acetates and other esters of varying viscosities, e. g. 10, 20, 50, 100 or more, may be employed as starting materials according to the viscosity required for the mixed ester produced.

Esterification may be continued until a completely esterified product has been produced or it may be interrupted while the ester still contains a certain proportion of free hydroxy groups, for example 0.3 or 0.1 hydroxy group per $C_6H_{10}O_5$ nucleus.

According to the degree of esterification to be effected and the esterification conditions employed the reaction may take 2 or 3 hours or considerably more, e. g. 15 or 20 hours. Preferably the reaction is carried out at a moderate temperature, for example at about 45° C. for the first 15–20 minutes, thereafter cooling to 25°, 30° or 35° C. It has been found that halogenated hydrocarbons, particularly ethylene dichloride, or mixtures of halogenated hydrocarbons, are particularly valuable as the main inert constituent of the esterification medium on account of the good colour of the products obtained when they are employed. Moreover, they are easily recovered from the other constituents of the esterification medium. The liquid medium should be employed in a fairly high proportion based on the weight of the ester used, e. g. 400–600% or more.

Ferric and stannic chlorides and particularly zinc chloride are very suitable catalysts, especially when used in conjunction with a hydrohalide acid. They do not themselves enter into combination with the cellulose ester and they do not, if used in reasonably small proportions, e. g. 0.5–1.5% or 2% of the weight of the initial ester, with similar proportions of acid at temperatures such as those mentioned above, reduce the viscosity of the materials unduly.

The mixed esters with the production of which the present application is particularly concerned are those containing the radicles of two fatty acids, particularly lower fatty acids containing less than six carbon atoms e. g. cellulose aceto-propionate, aceto-butyrate and propionate-butyrate. The process is however applicable to the production of mixed esters in general including those containing e. g. the stearyl, oleyl or other aliphatic acid radicle or the benzoyl or other aromatic acid radicle. The anhydride employed will of course depend upon the cellulose ester used as starting material and the mixed ester which it is desired to produce. In general, it should be employed in a proportion of about 120 to 150 or 200% of the quantity theoretically required to produce the mixed ester desired. This proportion is based on the usual assumption that each molecule of anhydride esterifies one free hydroxy group and forms one molecule of the corresponding acid.

However good a method may be from the point of view of product yield it cannot be regarded as a satisfactory industrial process unless it also renders possible an easy and cheap recovery of the excess reagents employed and by-products formed. In this respect the process of the present invention is very satisfactory, since the mixed ester can be obtained in the solid state by mixing the esterification solution with hot water or a hot aqueous solution of an organic acid in which the halogenated hydrocarbon and the ester are insoluble so as to evaporate off the halogenated hydrocarbon, thus simultaneously effecting separation of the product, the main inert diluent and the water-miscible constituents of the esterification solution. Any organic acid present in the aqueous fraction can then be extracted by washing the fraction with the halogenated hydrocarbon and recovered by fractional distillation of the halogenated hydrocarbon solution. Preferably the water or aqueous solution is used at a temperature slightly above the boiling point of the halogenated hydrocarbon so that the halogenated hydrocarbon is flashed off, as it has been found that this is not only a convenient method of separating the halogenated hydrocarbon but also the physical condition of the ester is better than it is when precipitation is effected at a lower temperature. It is also desirable, when an aqueous solution of an organic acid is employed, that the acid should be the one corresponding with the anhydride employed.

The following example is given to illustrate the invention, from which it will be seen that in general it is desirable to employ a low proportion of catalyst, a fairly high proportion of liquid medium, a moderate temperature and a moderate excess of the anhydride.

*Example*

100 parts of acetone-soluble cellulose acetate containing about 2.2 acetyl groups per $C_6H_{10}O_5$ nucleus is introduced into an esterification medium consisting of about 600 parts of ethylene dichloride, 60 parts of 88% butyric anhydride, 0.5 part of zinc chloride, and 0.25 part of hydrogen chloride, all by weight. The esterification medium is stirred at a temperature of about 45° C. for 15 minutes and afterwards at about 30° C. until the required degree of esterification has been effected, which usually takes about 16 to 24 hours, and is then sprayed into a large excess of aqueous butyric acid of about 2-5% concentration at a temperature of about 90° C., the temperature of the aqueous medium being maintained by the introduction of steam or hot water. The aqueous medium, which is contained in a closed vessel provided with an outlet for the ethylene chloride, is well stirred during the introduction of the reaction mixture. Ethylene dichloride and water distill over from the top of the vessel and are condensed and separated. The precipitated ester is separated from the dilute butyric acid and the acid is extracted by passing it in counter-current to the ethylene dichloride separated from the condensate. The ethylene chloride solution of butyric acid is passed into a still and the constituents of the solution separated by fractional distillation.

The precipitated ester is freed from residual butyric acid by washing it or distilling off the butyric acid with steam. When the purification process is complete the ester may be dried and it is then ready for use in the production of filaments, films or other industrial articles.

The term "fatty acid" used in the description and claims is to be understood to refer to formic acid and its higher homologues, i. e. acids having the general formula $C_nH_{2n}O_2$.

Having described my invention what I desire to secure by Letters Patent is:

1. Process for the production of mixed esters of cellulose, which comprises esterifying a carboxylic acid ester of cellulose containing free hydroxy groups in a liquid medium comprising the anhydride of a different carboxylic acid and a halogenated hydrocarbon, selected from the group consisting of methylene and ethylene dichlorides, and containing in solution an acidic metal halide, selected from the group consisting of ferric, stannic and zinc halides, as catalyst in an amount not exceeding 2% on the weight of said ester, the liquid medium employed being one which on completion of esterification yields a liquid medium which is a solvent for the mixed ester formed.

2. Process for the production of mixed esters of cellulose, which comprises esterifying a carboxylic acid ester of cellulose containing free hydroxy groups in a liquid medium comprising the anhydride of a different carboxylic acid containing less than six carbon atoms and a halogenated hydrocarbon, selected from the group consisting of methylene and ethylene dichlorides, and containing in solution an acidic metal halide, selected from the group consisting of ferric, stannic and zinc halides, as catalyst in an amount not exceeding 2% on the weight of said ester, the liquid medium employed being one which on completion of esterification yields a liquid medium which is a solvent for the mixed ester formed.

3. Process for the production of mixed esters of cellulose, which comprises esterifying a fatty acid ester of cellulose containing free hydroxy groups in a liquid medium comprising the anhydride of a different fatty acid and a halogenated hydrocarbon selected from the group consisting of methylene and ethylene dichlorides and which contains in solution an acidic metal halide, selected from the group consisting of ferric, stannic and zinc halides, as catalyst, in an amount not exceeding 2% of the weight of said ester, the liquid medium employed being one which on completion of esterification yields a liquid medium which is a solvent for the mixed ester formed.

4. Process for the production of mixed esters of cellulose, which comprises esterifying a fatty acid ester of cellulose containing free hydroxy groups in a liquid medium comprising the anhydride of a different fatty acid and a halogenated hydrocarbon selected from the group consisting of methylene and ethylene dichlorides and which contains in solution an acidic metal chloride, selected from the group consisting of ferric, stannic and zinc chlorides, as catalyst, in an amount not exceeding 2% of the weight of said ester, the liquid medium employed being one which on completion of esterification yields a liquid medium which is a solvent for the mixed ester formed.

5. Process for the production of mixed esters of cellulose, which comprises esterifying a fatty acid ester of cellulose containing free hydroxy groups in a liquid medium comprising the anhydride of a different fatty acid and a halogenated hydrocarbon selected from the group consisting of methylene and ethylene dichlorides and which contains a mixture of an acidic metal chloride, selected from the group consisting of ferric, stannic and zinc chlorides, and hydrochloric acid as catalyst, each in an amount not exceeding 2% of the weight of said ester, the liquid medium employed being one which on completion of esterification yields a liquid medium which is a solvent for the mixed ester formed.

6. Process for the production of mixed esters of cellulose which comprises esterifying a fatty acid ester of cellulose containing free hydroxy groups in a liquid medium which comprises the anhydride of a different fatty acid and an halogenated hydrocarbon selected from the group consisting of methylene and ethylene dichlorides and which contains in solution a mixture of zinc chloride and hydrochloric acid as catalyst each in an amount not exceeding 2% of the weight of said ester, the liquid medium employed being one which on completion of esterification yields a liquid medium which is a solvent for the mixed ester formed.

7. Process for the production of mixed esters of cellulose which comprises esterifying cellulose acetate containing free hydroxy groups in a liquid medium which comprises the anhydride of a different fatty acid containing less than six carbon atoms and an halogenated hydrocarbon selected from the group consisting of methylene and ethylene dichlorides and which contains in solution a mixture of zinc chloride and hydrochloric acid each in an amount not exceeding 0.5% of the weight of the cellulose acetate, the liquid medium employed being one which on completion of esterification yields a liquid medium which is a solvent for the mixed ester formed.

8. Process for the production of mixed esters of cellulose which comprises esterifying a carboxylic acid ester of cellulose containing free hydroxy groups in a liquid medium which comprises a carboxylic acid anhydride and a halogenated hydrocarbon selected from the group consisting of methylene and ethylene dichlorides and which contains in solution an acidic metal halide as catalyst in an amount not exceeding 2% of the weight of said ester, the liquid medium employed being one which on completion of the esterification yields a liquid medium which is a solvent for the mixed ester formed, mixing the finished esterification solution with hot water or a hot aqueous solution of a carboxylic acid of such concentration that the halogenated hydrocarbon and the mixed ester are substantially insoluble therein, so as to evaporate off the halogenated hydrocarbon and obtain the ester in a solid state, and separating the ester from the aqueous liquid.

9. Process for the production of mixed esters of cellulose which comprises esterifying a fatty acid ester of cellulose containing free hydroxy groups in a liquid medium which comprises the anhydride of a different fatty acid and an halogenated hydrocarbon selected from the group consisting of methylene and ethylene dichlorides and which contains in solution a mixture of zinc chloride and hydrochloric acid as catalyst in an amount not exceeding 2% of the weight of said ester, the liquid medium employed being one which on completion of esterification yields a liquid medium which is a solvent for the mixed ester formed, mixing the finished esterification solution with hot water or a hot aqueous solution of a fatty acid of such concentration that the halogenated hydrocarbon and the mixed ester are substantially insoluble therein, so as to evaporate off the halogenated hydrocarbon and obtain the ester in a solid state, and separating the ester from the aqueous liquid.

HENRY DREYFUS.